US011155479B2

(12) United States Patent
Gu et al.

(10) Patent No.: US 11,155,479 B2
(45) Date of Patent: Oct. 26, 2021

(54) METHODS AND COMPOSITIONS FOR REMOVING CONTAMINANTS FROM WASTEWATER STREAMS

(71) Applicant: Baker Hughes, Houston, TX (US)

(72) Inventors: Zhenning Gu, Sugar Land, TX (US); Jian Zou, Sugar Land, TX (US); Ksenija Babic, Katy, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 6 days.

(21) Appl. No.: 16/689,327

(22) Filed: Nov. 20, 2019

(65) Prior Publication Data

US 2020/0156970 A1  May 21, 2020

Related U.S. Application Data

(60) Provisional application No. 62/770,542, filed on Nov. 21, 2018.

(51) Int. Cl.
*C02F 1/52* (2006.01)
*C02F 1/56* (2006.01)
*C02F 101/20* (2006.01)
*C02F 101/22* (2006.01)
*C02F 101/32* (2006.01)
*C02F 103/36* (2006.01)

(52) U.S. Cl.
CPC .............. *C02F 1/56* (2013.01); *C02F 1/5272* (2013.01); *C02F 2101/203* (2013.01); *C02F 2101/22* (2013.01); *C02F 2101/32* (2013.01); *C02F 2103/365* (2013.01)

(58) Field of Classification Search
CPC ........ C02F 1/286; C02F 1/56; C02F 2101/20; C02F 2101/32; C02F 2103/365
See application file for complete search history.

(56) References Cited

U.S. PATENT DOCUMENTS

| 4,253,970 | A | | 3/1981 | Maher |
| 4,310,472 | A | * | 1/1982 | Buriks ...................... C02F 1/54 558/445 |
| 5,248,449 | A | | 9/1993 | Mitchell et al. |
| 5,543,056 | A | | 8/1996 | Murcott et al. |
| 8,894,863 | B2 | | 11/2014 | Soane et al. |
| 9,023,196 | B2 | | 5/2015 | Cooper et al. |
| 9,181,497 | B2 | | 11/2015 | Cooper et al. |
| 9,234,141 | B2 | | 1/2016 | O'Rear et al. |
| 2009/0127205 | A1 | | 5/2009 | Sikes et al. |
| 2009/0272693 | A1 | * | 11/2009 | Mabille .................... B01J 20/26 210/683 |
| 2014/0263058 | A1 | | 9/2014 | Fagher |
| 2014/0309410 | A1 | * | 10/2014 | Haider .................. B01J 20/265 536/20 |
| 2015/0197434 | A1 | | 7/2015 | Zou et al. |
| 2016/0362316 | A1 | | 12/2016 | Bara et al. |
| 2017/0274352 | A1 | * | 9/2017 | Bluemle ................ B01J 20/262 |

OTHER PUBLICATIONS

Khan, Adnan, Syed Badshah, and Claudio Airoldi. "Dithiocarbamated chitosan as a potent biopolymer for toxic cation remediation." Colloids and Surfaces B: Biointerfaces 87.1 (2011): 88-95. (Year: 2011).*
Barakat, M.A., "New trends in removing heavy metals from industrial wastewater", Arabian Journal of Chemistry, Jul. 2010, 361-377.
Swanson, Charles L., et al. "Mercury Removal from Waste Water with Starch Xanthate-Cationic Polymer Comples", Environmental Science & Technology, Jul. 1973, 614-619.
Wing, Robert E., et al., "Removal of Heavy Metals From Industrial Wastewaters Using Insoluble Starch Xanthate", EPA-600/2-78-085, May 1978, 118 pages.
Walterick, Gerald, et al., "Optimizing Mercury Removal Processes for Industrial Wasterwaters", GE Power & Water Technical Paper, Nov. 2012, 1-8.
Kim, Hyong-Tae, et al., "Application of Insoluble Cellulose Xanthate for the Removal of Heavy Metals from Aqueous Solution", Korean J. Chem. Eng. 16(3), Mar. 1999, 298-302.
EPA Capsule Report, "Aqueous Mercury Treatment", EPA/625/R-97/004, Jul. 1997, 38 pages.
Wing, R.E., "Emerging and Polishing Treatment Technologies for Removing Metals", American Electroplaters' Society, Inc., 1980, 1-23.
Swanson, C.L., et al., "Xanthation of Starch by a Continuous Process", I&EC Product Research & Development, Mar. 1964, 22-27.
Salam, Omar E. Abdel, et al., "A study of the removal characteristics of heavy metals from wastewater by low-cost adsorbents", Cairo University Journal of Advanced Research, Jan. 2011, 297-303.

(Continued)

Primary Examiner — Bradley R Spies
(74) Attorney, Agent, or Firm — Mossman, Kumar & Tyler, P.C.

(57) ABSTRACT

A chemically modified polysaccharide additive may be introduced to a wastewater stream in an effective amount to remove oil-coated particulates and/or heavy metal contaminants from the wastewater stream. The chemically modified polysaccharide includes at least one sulfur-containing moiety and/or nitrogen-containing moiety and the contaminants may be removed by using this chemically modified polysaccharide to capture the contaminants and separating out the captured contaminants.

16 Claims, No Drawings

(56) References Cited

OTHER PUBLICATIONS

Akintola, Oluwafemi S., et al., "Removal of mercury (II) via a novel series of cross-linked polydithiocarbamates", Journal of the Taiwan Institute of Chemical Engineers, Nov. 2015.

Wilhelm, S. Mark, et al., "Removal and Treatment of Mercury Contamination of Gas Processing Facilities", SPE 29721, Mar. 1985, 319-334.

Trimnell, D., et al., "Thiolation of Starch and Other Polysaccharides", Journal of Applied Polymer Science, vol. 17, 1973, 1607-1615.

Gallup, Darrell L., "Removal of mercury from water in the petroleum industry", Thermochem, Inc., Santa Rosa, CA, USA, date unknown, 1-15.

Abbott, Jim, et al., "Mercury removal technology and its application", Synetix, Belasis Av., Billingham, Cleveland, TS23 1LB, UK, date unknown, 9 pages.

\* cited by examiner

METHODS AND COMPOSITIONS FOR REMOVING CONTAMINANTS FROM WASTEWATER STREAMS

CROSS-REFERENCE TO RELATED APPLICATION

This application claims the benefit of Provisional Patent Application No. 62/770,542 filed Nov. 21, 2018, which is incorporated by reference herein in its entirety.

TECHNICAL FIELD

The present invention relates to methods and compositions for removal of contaminants from a wastewater stream, and more particularly relates, in one non-limiting embodiment, to methods and compositions for adding a chemically modified polysaccharide with multi-structured sulfur- and/or nitrogen-containing moieties to an industrial wastewater stream, such as a wastewater stream in the tertiary treatment stage, for removing at least a portion of oil-coated solid particulates and heavy metals from the wastewater stream.

BACKGROUND

Oil-coated solid particulates and heavy metals are among the main contaminants found in industrial wastewater streams, like wastewater streams from an oil and gas refinery. Many different processes and additives have been used to clean, purify, clarify and otherwise treat wastewater streams to remove such contaminants to meet environmental standards for discharge of the treated wastewater stream, reuse of the treated wastewater stream, and other purposes.

For example, natural material based polymers, such as starch and chitosan, are well-known for their ability to clean up particulates and oily contaminants with their high-charge density from water. In addition, functionalized polymers with sulfur- and/or nitrogen-containing moiety chelating groups have been used for heavy metal removal from aqueous streams.

However, it would be desirable to develop a treatment method or additive that would be effective in removing both types of contaminants found in wastewater, oil-coated solid particulates and heavy metals, simultaneously.

SUMMARY

There is provided, in one form, a method for removing at least a portion of contaminants from a wastewater stream in which an effective amount of chemically modified polysaccharide having at least one sulfur- and/or nitrogen-containing moiety is added to the wastewater stream to remove at least a portion of the contaminants.

There is further provided in another non-limiting embodiment, a treated wastewater stream comprising a wastewater stream containing oil-coated solid particulates and heavy metals and about 1 ppb to about 10000 ppm of a chemically modified polysaccharide containing at least one sulfur- and/or nitrogen-containing moiety.

DETAILED DESCRIPTION

It has been discovered that adding an effective amount of polysaccharide that is chemically modified to add at least one sulfur- and/or nitrogen-containing moiety is useful or effective for removing both oil-coated solid particulates and heavy metals from industrial wastewater streams to produce a treated stream that may meet the environmental standards for discharge to environment or reuse.

In one embodiment, the chemically modified polysaccharide useful for contaminant removal may be produced by adding sulfur-containing functional groups and nitrogen-containing functional groups on a polysaccharide, such as starch, cellulose, dextran, xylan, chitin, and/or chitosan, and their derivatives, by chemical reactions.

In a non-limiting embodiment, this chemical modification is achieved by sulfurization, imidazolation, azolation, thiolation, and/or aminolysis. More specifically, the chemically modified polysaccharide may be created by chemically bonding at least two side groups containing sulfur or nitrogen on the sides of the polymer chain via reaction with substances such as carbon disulfide ($CS_2$), sulfur dioxide ($SO_2$), elemental sulfur, organic thiol compounds (such as methanethiol, ethanethiol), and/or alkyl amines.

Non-limiting examples of sulfur- and/or nitrogen-containing moieties (or functional groups) that may be added to the polysaccharide to form the resulting chemically modified polysaccharide are thiocarbamate, dithiocarbamate, thionocarbonate, dithiocarbonate, thiadiazole, and/or imidazole. The chemically modified polysaccharide may contain a single type of moiety or a combination of these side groups, that is, a single polysaccharide may be modified to contain at least one sulfur-containing side group and at least one nitrogen-containing side group.

The wastewater stream to be treated may be any wastewater stream produced by an industrial process. In one particular non-limiting embodiment, the wastewater stream that is treated with the chemically modified polysaccharide may be wastewater discharged from an oil or gas refinery. In a further non-restrictive embodiment, the wastewater stream is a wastewater stream entering into a tertiary treatment stage of a water treatment plant, also known as the "polishing" stage.

The contaminants to be removed from the wastewater stream may be or include oil-coated solid particulate and heavy metals inorganic solids, such as but not limited to, mercury, selenium, copper, zinc, arsenic, lead, nickel, chromium, iron, cobalt, cadmium, and combinations thereof.

The amount of oil-coated solid contaminants present in the wastewater stream to be treated with the chemically modified polysaccharide may be, in one embodiment, about 0.01 ppm independently to about 100,000 ppm independently, or about 0.1 ppm independently to about 10,000 ppm independently. The amount of the heavy metal contaminants present in the wastewater stream to be treated with the chemically modified polysaccharide may be, in one embodiment, about 0.01 ppb independently to about 1000 ppm independently, or about 0.1 ppb independently to about 100 ppm independently. A goal of the method is to reduce the amount of contaminant to an acceptable level for the wastewater stream to be discharged to the environment or reused. Said differently, complete removal (via capture and separation, for example) of the contaminants from the wastewater stream is desirable, but it should be appreciated that complete removal is not necessary for the methods discussed herein to be considered effective. Success is obtained if more contaminants are removed from the wastewater stream using the chemically modified polysaccharide than in the absence of an effective amount of the chemically modified polysaccharide. In an exemplary embodiment, the effective amount of chemically modified polysaccharide for purposes of removing the contaminants from the wastewater stream, as these terms are defined herein, ranges from about 10 ppb independently to about 10000 ppm independently, alternatively from about 100 ppb independently to about 100 ppm independently. The term "independently" as used herein with respect to a range means that any threshold may be used together with any other threshold to form an acceptable alternative range.

In a non-limiting embodiment, the removal of the contaminants may be accomplished by using the chemically modified polysaccharide to capture the contaminants and separating out the captured contaminants by precipitation, floatation, and/or by filtration or skimming.

In another non-limiting embodiment, other additives may be added to the wastewater stream for treatment including, but not necessarily limited to, coagulant, flocculent, and mixtures thereof.

In the foregoing specification, the invention has been described with reference to specific embodiments thereof, and has been described as effective in providing methods and treatments for removing contaminants from a wastewater stream. However, it will be evident that various modifications and changes can be made thereto without departing from the broader spirit or scope of the invention as set forth in the appended claims. Accordingly, the specification is to be regarded in an illustrative rather than a restrictive sense. For example, wastewater streams, polysaccharides, sulfur- and/or nitrogen-containing functional groups/moieties, contaminants, chemical reaction mechanisms, and removal processes falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method may consist of or consist essentially of adding an effective amount of polysaccharide that is chemically modified to have at least one sulfur- and/or nitrogen-containing moiety in an amount effective to remove at least a portion of the contaminants from industrial wastewater streams to produce a treated stream.

Alternatively, the treated fluid may comprise a wastewater stream containing oil-coated solid particulates and heavy metals; and an additive consisting of or consisting essentially of from about 10 ppb to about 10000 ppm of a chemically modified polysaccharide, wherein the chemically modified polysaccharide contains at least one sulfur- and/or nitrogen-containing moiety.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for removing at least a portion of contaminants from a wastewater stream containing contaminants, the method comprising:
   adding an effective amount of a chemically modified polysaccharide to the wastewater stream to remove at least a portion of contaminants from the wastewater stream to produce a treated wastewater stream, wherein the chemically modified polysaccharide contains at least one sulfur-containing moiety selected from a group consisting of thiocarbamate, dithiocarbamate, thionocarbonate, dithiocarbonate, thiadiazole, and combinations thereof, the polysaccharide modified to contain a single type of moiety: a sulfur-containing moiety.

2. The method of claim 1, wherein the at least one sulfur-containing containing moiety is chemically added to the polysaccharide by a process selected from the group consisting of sulfurization, thiolation, and combinations of these processes.

3. The method of claim 1, wherein the polysaccharide is selected from a group consisting of starch, cellulose, chitin, chitosan, dextran, xylan, derivatives thereof, and combinations thereof.

4. The method of claim 1, wherein the contaminants comprise oil-coated solid particulates and heavy metals.

5. The method of claim 4, wherein the heavy metals are selected from a group consisting of mercury, selenium, copper, zinc, arsenic, lead, nickel, chromium, iron, cobalt, cadmium, and combinations thereof.

6. The method of claim 1, wherein the wastewater stream is wastewater discharged from an oil or gas refinery.

7. The method of claim 1, wherein the wastewater stream is a wastewater stream entering into a tertiary treatment stage of a water treatment plant.

8. The method of claim 4, wherein the amount of oil-coated solid particulates present in the wastewater stream is 0.01 ppm to 100000 ppm and the amount of heavy metals present in the wastewater stream is 0.01 ppb to 1000 ppm.

9. The method of claim 1, wherein the effective amount of chemically modified polysaccharide added to the wastewater stream ranges from about 10 ppb to about 10000 ppm.

10. The method of claim 1, wherein the method comprises using the chemically modified polysaccharide to capture the contaminants and the method further comprises separating out the captured contaminants by precipitation.

11. A treated wastewater stream comprising:
    a wastewater stream containing comprising contaminants comprising oil-coated solid particulates, and heavy metals; and
    an additive comprising from about 10 ppb to about 10000 ppm of a chemically modified polysaccharide, wherein the chemically modified polysaccharide contains at least one sulfur-containing moiety selected from a group consisting of thiocarbamate, dithiocarbamate, thionocarbonate, dithiocarbonate, thiadiazole, and combinations thereof, the polysaccharide modified to contain a single type of moiety: a sulfur-containing moiety.

12. The treated wastewater stream of claim 11, wherein the at least one sulfur-containing moiety is chemically added to the polysaccharide by a process selected from the group consisting of sulfurization, thiolation, and combinations of these processes.

13. The treated wastewater stream of claim 11, wherein the polysaccharide is selected from a group consisting of starch, cellulose, chitin, chitosan, dextran, xylan, derivatives thereof, and combinations thereof.

14. The treated wastewater stream of claim 11, wherein the heavy metals are selected from a group consisting of mercury, selenium, copper, zinc, arsenic, lead, nickel, chromium, iron, cobalt, cadmium, and combinations thereof.

15. The treated wastewater stream of claim 11, wherein the wastewater stream is wastewater discharged from an oil or gas refinery.

16. The treated wastewater stream of claim 12, wherein the wastewater stream is a wastewater stream entering into a tertiary treatment stage of a water treatment plant.

* * * * *